US012369006B2

(12) United States Patent
Eronen et al.

(10) Patent No.: US 12,369,006 B2
(45) Date of Patent: Jul. 22, 2025

(54) ASSOCIATED SPATIAL AUDIO PLAYBACK

(71) Applicant: Nokia Technologies Oy, Espoo (FI)

(72) Inventors: Antti Eronen, Tampere (FI); Arto Lehtiniemi, Lempaala (FI); Jussi Leppanen, Tampere (FI); Lasse Laaksonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/390,531

(22) Filed: Dec. 20, 2023

(65) Prior Publication Data

US 2024/0129683 A1    Apr. 18, 2024

Related U.S. Application Data

(63) Continuation of application No. 17/593,702, filed as application No. PCT/FI2020/050170 on Mar. 19, 2020, now Pat. No. 11,902,768.

(30) Foreign Application Priority Data

Mar. 25, 2019   (GB) ..................... 1904091

(51) Int. Cl.
*H04S 7/00*   (2006.01)
*G06F 3/16*   (2006.01)

(52) U.S. Cl.
CPC .............. *H04S 7/302* (2013.01); *G06F 3/165* (2013.01)

(58) Field of Classification Search
CPC ................................. H04S 7/302; G06F 3/165
USPC .................... 381/1, 2, 310, 307, 12
See application file for complete search history.

(56) References Cited

U.S. PATENT DOCUMENTS

| | | | |
|---|---|---|---|
| 9,609,383 B1 | 3/2017 | Hirst | |
| 10,878,837 B1 | 12/2020 | Guo | |
| 11,816,522 B1* | 11/2023 | Schweinfurth | ....... G06F 16/438 |
| 2002/0150254 A1 | 10/2002 | Wilcock et al. | |
| 2014/0023196 A1 | 1/2014 | Xiang et al. | |
| 2015/0332680 A1 | 11/2015 | Crockett et al. | |
| 2018/0109901 A1 | 4/2018 | Laaksonen | |
| 2018/0270602 A1 | 9/2018 | Laaksonen | |
| 2020/0196086 A1 | 6/2020 | Swaminathan | |

FOREIGN PATENT DOCUMENTS

| | | |
|---|---|---|
| CN | 104604257 A | 5/2015 |
| CN | 109313907 A | 2/2019 |
| EP | 3264259 A1 | 1/2018 |
| WO | WO-2016/209607 A1 | 12/2016 |
| WO | WO-2018/132385 A1 | 7/2018 |
| WO | WO-2019/005325 A1 | 1/2019 |

* cited by examiner

*Primary Examiner* — Thjuan K Addy
(74) *Attorney, Agent, or Firm* — McCarter & English LLP

(57) ABSTRACT

An apparatus including circuitry configured to: obtain at least one location and/or orientation associated with a user; obtain, based on the at least one location and/or orientation, one or more audio element, wherein the one or more audio element at least partially forms an audio scene; obtain, based on the at least one location and/or orientation, at least one auxiliary audio element, the at least one auxiliary audio element being at least one audio element or a combination of audio elements, wherein the at least one auxiliary audio element is associated with at least a part of the audio scene and is located at an outside zone of the audio scene; render the obtained audio element and/or at least one auxiliary audio element.

29 Claims, 12 Drawing Sheets

ASSOCIATED SPATIAL AUDIO PLAYBACK

CROSS REFERENCE TO RELATED APPLICATIONS

This patent application a continuation patent application of copending U.S. application Ser. No. 17/593,702 filed Sep. 23, 2021, which is a U.S. National Stage application of International Patent Application Number PCT/FI2020/050170 filed Mar. 19, 2020, which are hereby incorporated by reference in their entireties, and claims priority to GB 1904091.4 filed Mar. 25, 2019.

FIELD

The present application relates to apparatus and methods for spatial audio playback.

BACKGROUND

In a 3D space, there are six degrees of freedom defining the way a user may move within said space. This movement is divided into two categories: rotational and translational movement (with three degrees of freedom each). Rotational movement is sufficient for a simple virtual reality (VR) experience where the user may turn their head (pitch, yaw, and roll) to experience the space from a static point. Translational movement means that the user may also change the position of the rendering. In other words move along the x, y, and z axes according to their wishes. Free-viewpoint augmented reality (AR) and VR experiences allow for both rotational and translational movements. The term extended reality (XR) can be used to refer to all real-and-virtual combined environments such as AR and VR.

It is common to talk about the degrees of freedom (and the related experiences) using the terms 3 DoF (three degrees of freedom), 3 DoF+ and 6 DoF (six degrees of freedom). 3 DoF+ falls somewhat between 3 DoF and 6 DoF in that it allows for some limited user movement, for example a restricted translational degree of freedom while allowing full range of motion for the rotational movement. Thus 3 DoF+ can sometimes be considered to implement a restricted 6 DoF where the user is sitting down but can lean their head in various directions.

The ISO/IEC Moving Picture Experts Group (MPEG) is currently standardizing immersive media technologies under the name MPEG-I. This includes methods for various virtual reality (VR), augmented reality (AR) or mixed reality (MR) use cases. MPEG-I is divided into three phases: Phases 1a, 1b, and 2. Phases 1a and 1b consider 3 DoF and 3 DoF+ use cases, and Phase 2 will then allow at least significantly unrestricted 6 DoF. For audio standardization, the focus is already on 6 DoF audio, as existing methods are thought to cover at least significant parts of the 3 DoF/3 DoF+ use cases. However, there are certain aspects where at least 3 DoF+ (Phase 1b) standards will require further development.

Immersive or spatial audio (for 3 DoF/3 DoF+/6 DoF) may consist of various audio signals and information. For example a channel-based bed and audio objects, first-order or higher-order ambisonics (FOA/HOA) and audio objects, any combination of these such as audio objects only, or any equivalent spatial audio representation may be used. These audio signals may be carried as MPEG-H 3D Audio, specified as ISO/IEC 23008-3 (MPEG-H Part 3), audio coding standard, along with additional metadata and new rendering technology which will constitute the MPEG-I Audio standard.

SUMMARY

There is provided according to a first aspect an apparatus comprising means configured to: obtain at least one location and/or orientation associated with a user; obtain, based on the at least one location and/or orientation, one or more audio element, wherein the one or more audio element at least partially forms an audio scene; obtain, based on the at least one location and/or orientation, at least one auxiliary audio element, the at least one auxiliary audio element being at least one audio element or a combination of audio elements, wherein the at least one auxiliary audio element is associated with at least a part of the audio scene and is located at an outside zone of the audio scene; and render the obtained audio element and/or at least one auxiliary audio element.

The user may be associated with a further apparatus.

The means configured to render may be configured to render the obtained audio element and/or at least one auxiliary audio element based on a determination that the apparatus has performed a zoom or move action.

The zoom or move action may be such that the user can no longer hear the obtained audio element.

The means configured to obtain, based on the at least one location and/or orientation, one or more audio element may be configured to: determine a number of sets of audio elements within the audio scene wherein each of the sets of audio elements has an associated location and/or orientation within the audio scene; calculate a distance between the obtained location and/or orientation and an average location of audio elements location of each set of audio elements; select the one or more audio element from the number of sets of audio elements based on the distance between the obtained location and/or orientation and an average location of audio elements location of each set of audio elements.

The means configured to select the one or more audio element from the number of sets of audio elements based on the distance between the obtained location and/or orientation and an average location of audio elements location of each set of audio elements may be configured to select the one or more audio elements whose centre is closest to the obtained location.

The determination that the apparatus has performed a zoom or move action may be a zoom towards an audio element not within the set of audio elements.

The means configured to obtain, based on the at least one location and/or orientation, at least one auxiliary audio element may be configured to augment a selected set of audio elements with the at least one auxiliary audio element.

The means configured to augment the selected set of audio elements with the at least one auxiliary audio element may be configured to downmix at least one set of the audio elements.

The means configured to render the obtained audio element and/or at least one auxiliary audio element may be configured to: render the obtained audio element where the user is within a perceptual scope associated with the set of audio elements; render the at least one auxiliary audio element where the user is beyond the perceptual scope.

According to a second aspect there is provided an apparatus comprising means configured to: obtain an audio scene, the audio scene comprising at least two audio elements and a position and/or orientation associated with each of the at least two audio elements; divide the audio scene into sets comprising at least one of the at least two audio elements, where the sets represent a complete audio scene; and create at least one auxiliary audio element to complement each set, wherein the at least one auxiliary audio element and the sets form augmented sets.

The audio scene may comprise MPEG-H 3D encoded audio waveforms as audio elements and metadata comprising the position and/or orientation.

The position may be in at least one of: Cartesian co-ordinates (X,Y,Z); polar coordinates (azimuth, elevation, radius).

The orientation may be a sound element orientation comprising an azimuth and an elevation.

The means configured to divide the audio scene into sets comprising at least one of the at least two audio elements, where the sets represent a complete audio scene may be configured to cluster audio elements based on positions of the audio elements into clusters of a first clustering number.

The means configured to cluster audio elements based on positions of the audio elements into clusters of a first clustering number may be configured to: randomly select a first number of audio elements and define the first number of cluster centres as the positions of the selected first number of audio elements; repeatedly allocate the positions of the audio elements to a nearest cluster centre and update the cluster centre to correspond to the mean of the positions of audio elements assigned to each centre.

The means configured to obtain one or more audio element outside each set may be configured to: divide the set into spatial sectors around a set origin with each sector having a defined angular range; and identify any audio elements outside the set and within the spatial sector and/or within a radius threshold from the set origin.

The means configured to create an auxiliary audio element to complement each set may be configured to: combine the audio elements identified outside the set and within the spatial sector and/or within a radius threshold from the set origin; and associate the combination as the auxiliary audio element to the spatial sector of the set.

The means configured to combine the audio elements identified outside the set and within the spatial sector and/or within a radius threshold from the set origin may be configured to downmix the identified audio elements.

The means may be configured to provide the augmented sets to the further apparatus.

According to a third aspect there is provided a method for operating an apparatus comprising: obtaining at least one location and/or orientation associated with a user; obtaining, based on the at least one location and/or orientation, one or more audio element, wherein the one or more audio element at least partially forms an audio scene; obtaining, based on the at least one location and/or orientation, at least one auxiliary audio element, the at least one auxiliary audio element being at least one audio element or a combination of audio elements, wherein the at least one auxiliary audio element is associated with at least a part of the audio scene and is located at an outside zone of the audio scene; and rendering the obtained audio element and/or at least one auxiliary audio element.

The user may be associated with a further apparatus.

Rendering may comprise rendering the obtained audio element and/or at least one auxiliary audio element based on determining that the apparatus has performed a zoom or move action.

The zoom or move action may be such that the user can no longer hear the obtained audio element.

Obtaining, based on the at least one location and/or orientation, one or more audio element may comprise: determining a number of sets of audio elements within the audio scene wherein each of the sets of audio elements has an associated location and/or orientation within the audio scene; calculating a distance between the obtained location and/or orientation and an average location of audio elements location of each set of audio elements; selecting the one or more audio element from the number of sets of audio elements based on the distance between the obtained location and/or orientation and an average location of audio elements location of each set of audio elements.

Selecting the one or more audio element from the number of sets of audio elements based on the distance between the obtained location and/or orientation and an average location of audio elements location of each set of audio elements may comprise selecting the one or more audio elements whose centre is closest to the obtained location.

The determining that the apparatus has performed a zoom or move action may be a zoom towards an audio element not within the set of audio elements.

Obtaining, based on the at least one location and/or orientation, at least one auxiliary audio element may comprise augmenting a selected set of audio elements with the at least one auxiliary audio element.

Augmenting the selected set of audio elements with the at least one auxiliary audio element may comprise downmixing at least one set of the audio elements.

Rendering the obtained audio element and/or at least one auxiliary audio element may comprise: rendering the obtained audio element where the user is within a perceptual scope associated with the set of audio elements; rendering the at least one auxiliary audio element where the user is beyond the perceptual scope.

According to a fourth aspect there is provided a method for operating an apparatus comprising: obtaining an audio scene, the audio scene comprising at least two audio elements and a position and/or orientation associated with each of the at least two audio elements; dividing the audio scene into sets comprising at least one of the at least two audio elements, where the sets represent a complete audio scene; and create at least one auxiliary audio element to complement each set, wherein the at least one auxiliary audio element and the sets form augmented sets.

The audio scene may comprise MPEG-H 3D encoded audio waveforms as audio elements and metadata comprising the position and/or orientation.

The position may be in at least one of: Cartesian co-ordinates (X,Y,Z); polar coordinates (azimuth, elevation, radius).

The orientation may be a sound element orientation comprising an azimuth and an elevation.

Dividing the audio scene into sets comprising at least one of the at least two audio elements, where the sets represent a complete audio scene may comprise clustering audio elements based on positions of the audio elements into clusters of a first clustering number.

Clustering audio elements based on positions of the audio elements into clusters of a first clustering number may comprise: randomly selecting a first number of audio elements and defining the first number of cluster centres as the positions of the selected first number of audio elements; repeatedly allocating the positions of the audio elements to a nearest cluster centre and updating the cluster centre to correspond to the mean of the positions of audio elements assigned to each centre.

Obtaining one or more audio element outside each set may comprise: dividing the set into spatial sectors around a set origin with each sector having a defined angular range; and identifying any audio elements outside the set and within the spatial sector and/or within a radius threshold from the set origin.

Creating an auxiliary audio element to complement each set may comprise: combining the audio elements identified outside the set and within the spatial sector and/or within a radius threshold from the set origin; and associating the combination as the auxiliary audio element to the spatial sector of the set.

Combining the audio elements identified outside the set and within the spatial sector and/or within a radius threshold from the set origin may comprise downmixing the identified audio elements.

The method may comprise providing the augmented sets to the further apparatus.

According to a fifth aspect there is provided an apparatus comprising at least one processor and at least one memory including a computer program code, the at least one memory and the computer program code configured to, with the at least one processor, cause the apparatus at least to: obtain at least one location and/or orientation associated with a user; obtain, based on the at least one location and/or orientation, one or more audio element, wherein the one or more audio element at least partially forms an audio scene; obtain, based on the at least one location and/or orientation, at least one auxiliary audio element, the at least one auxiliary audio element being at least one audio element or a combination of audio elements, wherein the at least one auxiliary audio element is associated with at least a part of the audio scene and is located at an outside zone of the audio scene; and render the obtained audio element and/or at least one auxiliary audio element.

The user may be associated with a further apparatus.

The apparatus caused to render may be caused to render the obtained audio element and/or at least one auxiliary audio element based on a determination that the apparatus has performed a zoom or move action.

The zoom or move action may be such that the user can no longer hear the obtained audio element.

The apparatus caused to obtain, based on the at least one location and/or orientation, one or more audio element may be caused to: determine a number of sets of audio elements within the audio scene wherein each of the sets of audio elements has an associated location and/or orientation within the audio scene; calculate a distance between the obtained location and/or orientation and an average location of audio elements location of each set of audio elements; select the one or more audio element from the number of sets of audio elements based on the distance between the obtained location and/or orientation and an average location of audio elements location of each set of audio elements.

The apparatus caused to select the one or more audio element from the number of sets of audio elements based on the distance between the obtained location and/or orientation and an average location of audio elements location of each set of audio elements may be caused to select the one or more audio elements whose centre is closest to the obtained location.

The determination that the apparatus has performed a zoom or move action may be a zoom towards an audio element not within the set of audio elements.

The apparatus caused to obtain, based on the at least one location and/or orientation, at least one auxiliary audio element may be caused to augment a selected set of audio elements with the at least one auxiliary audio element.

The apparatus caused to augment the selected set of audio elements with the at least one auxiliary audio element may be caused to downmix at least one set of the audio elements.

The apparatus caused to render the obtained audio element and/or at least one auxiliary audio element may be caused to: render the obtained audio element where the user is within a perceptual scope associated with the set of audio elements; render the at least one auxiliary audio element where the user is beyond the perceptual scope.

According to a sixth aspect there is provided an apparatus comprising at least one processor and at least one memory including a computer program code, the at least one memory and the computer program code configured to, with the at least one processor, cause the apparatus at least to: obtain an audio scene, the audio scene comprising at least two audio elements and a position and/or orientation associated with each of the at least two audio elements; divide the audio scene into sets comprising at least one of the at least two audio elements, where the sets represent a complete audio scene; and create at least one auxiliary audio element to complement each set, wherein the at least one auxiliary audio element and the sets form augmented sets.

The audio scene may comprise MPEG-H 3D encoded audio waveforms as audio elements and metadata comprising the position and/or orientation.

The position may be in at least one of: Cartesian coordinates (X,Y,Z); polar coordinates (azimuth, elevation, radius).

The orientation may be a sound element orientation comprising an azimuth and an elevation.

The apparatus caused to divide the audio scene into sets comprising at least one of the at least two audio elements, where the sets represent a complete audio scene may be caused to cluster audio elements based on positions of the audio elements into clusters of a first clustering number.

The apparatus caused to cluster audio elements based on positions of the audio elements into clusters of a first clustering number may be caused to: randomly select a first number of audio elements and define the first number of cluster centres as the positions of the selected first number of audio elements; repeatedly allocate the positions of the audio elements to a nearest cluster centre and update the cluster centre to correspond to the mean of the positions of audio elements assigned to each centre.

The apparatus caused to obtain one or more audio element outside each set may be caused to: divide the set into spatial sectors around a set origin with each sector having a defined angular range; and identify any audio elements outside the set and within the spatial sector and/or within a radius threshold from the set origin.

The apparatus caused to create an auxiliary audio element to complement each set may be caused to: combine the audio elements identified outside the set and within the spatial sector and/or within a radius threshold from the set origin; and associate the combination as the auxiliary audio element to the spatial sector of the set.

The apparatus caused to combine the audio elements identified outside the set and within the spatial sector and/or within a radius threshold from the set origin may be caused to downmix the identified audio elements.

The apparatus may be caused to provide the augmented sets to the further apparatus.

According to a seventh aspect there is provided an apparatus comprising: obtaining circuitry configured to obtain at least one location and/or orientation associated with a user;

obtaining circuitry configured to obtain, based on the at least one location and/or orientation, one or more audio element, wherein the one or more audio element at least partially forms an audio scene; obtaining circuitry configured to obtain, based on the at least one location and/or orientation, at least one auxiliary audio element, the at least one auxiliary audio element being at least one audio element or a combination of audio elements, wherein the at least one auxiliary audio element is associated with at least a part of the audio scene and is located at an outside zone of the audio scene; and rendering circuitry configured to render the obtained audio element and/or at least one auxiliary audio element.

According to an eighth aspect there is provided an apparatus comprising: obtaining circuitry configured to obtain an audio scene, the audio scene comprising at least two audio elements and a position and/or orientation associated with each of the at least two audio elements; dividing circuitry configured to divide the audio scene into sets comprising at least one of the at least two audio elements, where the sets represent a complete audio scene; and creating circuitry configured to create at least one auxiliary audio element to complement each set, wherein the at least one auxiliary audio element and the sets form augmented sets According to a ninth aspect there is provided a computer program comprising instructions [or a computer readable medium comprising program instructions] for causing an apparatus to perform at least the following: obtaining at least one location and/or orientation associated with a user; obtaining, based on the at least one location and/or orientation, one or more audio element, wherein the one or more audio element at least partially forms an audio scene; obtaining, based on the at least one location and/or orientation, at least one auxiliary audio element, the at least one auxiliary audio element being at least one audio element or a combination of audio elements, wherein the at least one auxiliary audio element is associated with at least a part of the audio scene and is located at an outside zone of the audio scene; and rendering the obtained audio element and/or at least one auxiliary audio element.

According to a tenth aspect there is provided a computer program comprising instructions [or a computer readable medium comprising program instructions] for causing an apparatus to perform at least the following: obtaining an audio scene, the audio scene comprising at least two audio elements and a position and/or orientation associated with each of the at least two audio elements; dividing the audio scene into sets comprising at least one of the at least two audio elements, where the sets represent a complete audio scene; and creating at least one auxiliary audio element to complement each set, wherein the at least one auxiliary audio element and the sets form augmented sets.

According to an eleventh aspect there is provided a non-transitory computer readable medium comprising program instructions for causing an apparatus to perform at least the following: obtaining at least one location and/or orientation associated with a user; obtaining, based on the at least one location and/or orientation, one or more audio element, wherein the one or more audio element at least partially forms an audio scene; obtaining, based on the at least one location and/or orientation, at least one auxiliary audio element, the at least one auxiliary audio element being at least one audio element or a combination of audio elements, wherein the at least one auxiliary audio element is associated with at least a part of the audio scene and is located at an outside zone of the audio scene; and rendering the obtained audio element and/or at least one auxiliary audio element.

According to a twelfth aspect there is provided a non-transitory computer readable medium comprising program instructions for causing an apparatus to perform at least the following: obtaining an audio scene, the audio scene comprising at least two audio elements and a position and/or orientation associated with each of the at least two audio elements; dividing the audio scene into sets comprising at least one of the at least two audio elements, where the sets represent a complete audio scene; and creating at least one auxiliary audio element to complement each set, wherein the at least one auxiliary audio element and the sets form augmented sets.

According to a thirteenth aspect there is provided an apparatus comprising: means for obtaining at least one location and/or orientation associated with a user; means for obtaining, based on the at least one location and/or orientation; one or more audio element, wherein the one or more audio element at least partially forms an audio scene; means for obtaining, based on the at least one location and/or orientation, at least one auxiliary audio element, the at least one auxiliary audio element being at least one audio element or a combination of audio elements, wherein the at least one auxiliary audio element is associated with at least a part of the audio scene and is located at an outside zone of the audio scene; and means for rendering the obtained audio element and/or at least one auxiliary audio element.

According to a fourteenth aspect there is provided an apparatus comprising: means for obtaining an audio scene, the audio scene comprising at least two audio elements and a position and/or orientation associated with each of the at least two audio elements; means for dividing the audio scene into sets comprising at least one of the at least two audio elements, where the sets represent a complete audio scene; and means for creating at least one auxiliary audio element to complement each set, wherein the at least one auxiliary audio element and the sets form augmented sets.

According to a fifteenth aspect there is provided a computer readable medium comprising program instructions for causing an apparatus to perform at least the following: obtaining at least one location and/or orientation associated with a user; obtaining, based on the at least one location and/or orientation, one or more audio element, wherein the one or more audio element at least partially forms an audio scene; obtaining, based on the at least one location and/or orientation, at least one auxiliary audio element, the at least one auxiliary audio element being at least one audio element or a combination of audio elements, wherein the at least one auxiliary audio element is associated with at least a part of the audio scene and is located at an outside zone of the audio scene; and rendering the obtained audio element and/or at least one auxiliary audio element.

According to a sixteenth aspect there is provided a computer readable medium comprising program instructions for causing an apparatus to perform at least the following: obtaining an audio scene, the audio scene comprising at least two audio elements and a position and/or orientation associated with each of the at least two audio elements; dividing the audio scene into sets comprising at least one of the at least two audio elements, where the sets represent a complete audio scene; and creating at least one auxiliary audio element to complement each set, wherein the at least one auxiliary audio element and the sets form augmented sets.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for the provision of effective spatial signal playback.

Figure 1:
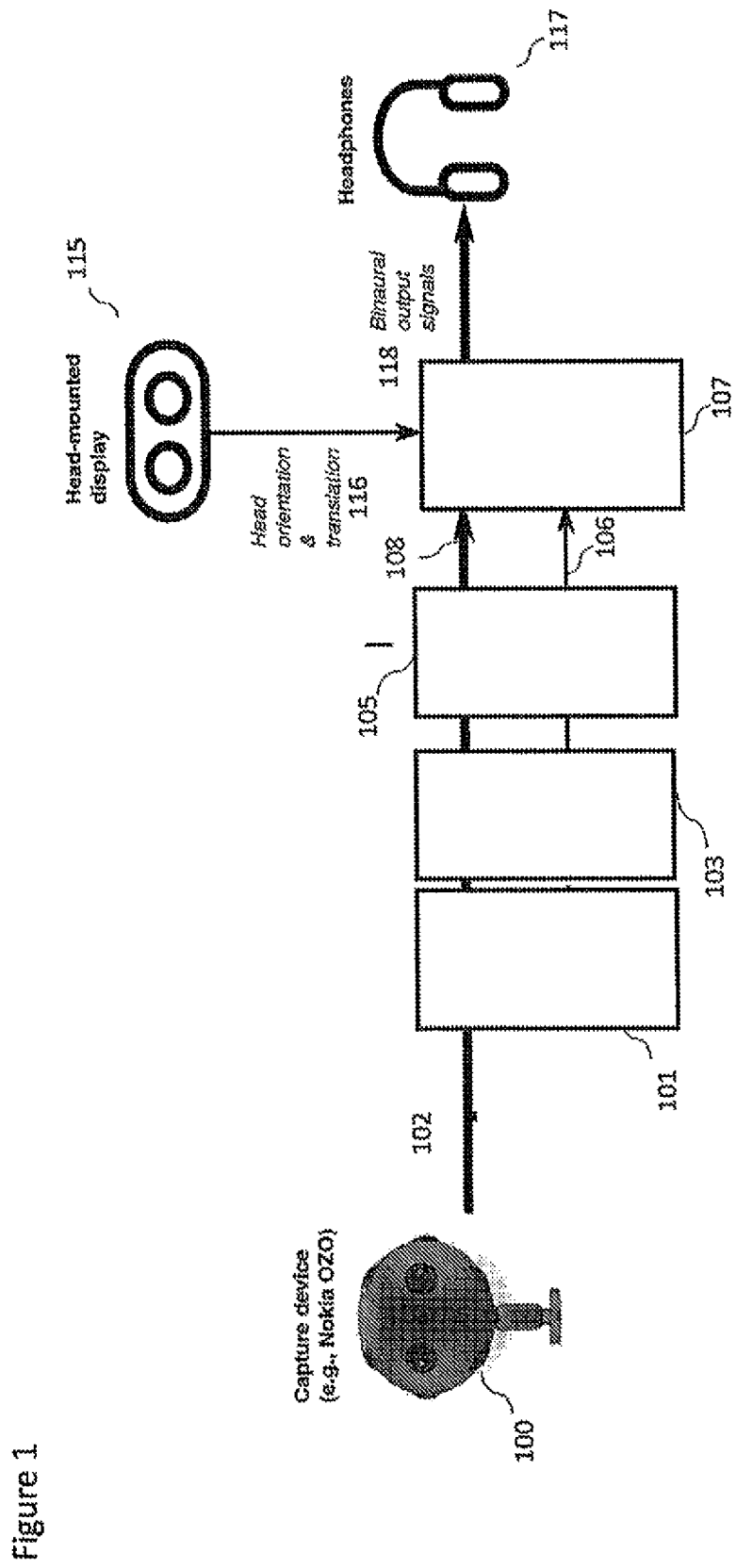
FIG. 1 shows schematically an example of a system suitable for implementing apparatus according to some embodiments.

With respect to FIG. 1 is shown an example overview system and which shows an end to end workflow as well as content consumption.

The system comprises a capture device 100, a content processor 101, a content distributor formatter 103, a content server 105, a content client 107, a client input device 115, and a client output device 117.

The capture device 100 is shown in FIG. 1 as a Nokia OZO device 100 comprising a microphone array configured to capture audio signals and multiple cameras configured to capture images/video data. The capture device in some embodiments may be one or more apparatus configured to capture suitable media. For example the capture device with respect to the audio capture capability may comprise one or more of a microphone array, an ambisonics capture microphone, or one or more close-up microphones capturing various audio sources. The capture device may comprise one or more image/video capture devices such as cameras, depth of field camera, light-field cameras etc. The capture device may comprise one or more positioning devices which enable tracking or otherwise obtaining the position for one or more audio objects or audio sources captured with microphones. In addition to capture device 100, there may be other input methods for providing audio (and/or image/video data) 102 that will constitute at least a part of the scene. For example, various post-production tools can be used to add or modify audio objects. It is also noted that audio capture need not happen simultaneously for the audio scene but the audio scene can be created in a studio from various audio objects or scene based audio captured at different times or created synthetically.

The audio and/or image/video data 102 may be passed to the content processor 101. The content processor 101 may be configured to receive the media captured by the capture device or other input device, service or software. In some embodiments the content processor is configured to analyse at least the audio signals to determine parameters or metadata associated with the audio scene. In some embodiments the image/video data may also be used to assist the analysis to determine the metadata. In some other embodiments the image/video data is processed by the content processor 101 to determine the metadata. In some embodiments, at least some of the determination of parameters or metadata associated with the audio scene may be carried out by a user through a user interface.

The content processor 101 can, for example, be a computer (running suitable software stored on memory and on at least one processor), or alternatively a specific device utilizing, for example, FPGAs or ASICs. As shown herein in further detail the audio source or audio object metadata may comprise, for each time-frequency analysis interval, at last one of: a position (such as an azimuth, elevation and distance or a direction and radius from a reference or 'sweet spot') parameter, an energy (such as an energy ratio or gain) parameter, and a size/spread parameter. The parameters may in some embodiments be considered to be spatial audio parameters. In other words the spatial audio parameters comprise parameters which aim to characterize the sound-field.

In some embodiments the parameters generated for audio objects can comprise for each time interval or time-frequency slice, at last one of: a position (such as an azimuth, elevation and distance or a direction and radius from a reference or 'sweet spot') parameter.

Furthermore in some embodiments the audio objects for audio objects are expressed in other suitable forms.

In some embodiments the parameters generated may differ from frequency band to frequency band. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. These parameters and the media signals may furthermore be passed to the content distribution formatter 103. The content distribution formatter in some embodiments comprises a downmixer configured to receive the multi-channel audio signals and downmix the signals to a determined number of channels and output the downmix signals. For example the downmixer may be configured to generate a 2 audio channel downmix of the multi-channel signals. The determined number of channels may be any suitable number of channels. In some embodiments the downmixer is optional and the multi-channel audio signals are passed unprocessed to an encoder in the same manner as the downmix signal are in this example. In some embodiments, the audio may be represented as a channel-based bed and audio objects, first-order or higher-order ambisonics (FOA/HOA) and audio objects, any combination of these such as audio objects only, or any equivalent spatial audio representation.

Similarly the content distribution formatter 103 may be configured to encode the audio signals and/or spatial audio parameters in order to reduce bit rate, and multiplexed to one stream. The encoding and the multiplexing may be implemented using any suitable scheme. For example, the audio signals may be carried as MPEG-H 3D Audio, specified as ISO/IEC 23008-3 (MPEG-H Part 3), audio coding standard, along with the metadata required for 6 DoF rendering. Coding of the audio as MPEG-H 3D audio and the additional metadata to enable listener translation and/or interactivity will be specified in the MPEG-I Audio standard.

In some embodiments a content creator, for example a user operating or editing the captured media provides additional information which may be encoded as additional metadata. For example in some embodiments the content creator may be able to add additional information to define at least one interaction parameter associated with the (audio) sources or to add creative intent information or audio effect specification metadata as part of the distribution file format. The distribution file may be the Omnidirectional Media Application Format version 2 specified in MPEG-I part 2 or other suitable format.

This information may for example be specified as metadata which is either delivered in-band with the audio data or out-of-band along with the audio and visual media streams.

The metadata may for example be used to control the behaviour of a specific audio object under the zooming operation and may enable a content playback client to modify the audio rendering.

The concept as discussed in further detail hereafter may improve over the known systems in that from the server/delivery perspective where there is a limited network bandwidth or limited storage in a client device, it may not be possible to deliver a complete 6 DoF audio scene if it is too large (and thus the audio scene does not fit within device) or it takes too long time (if the network bandwidth is too small). Furthermore although the following example express the concept in terms of 6 DoF examples in some embodiments a 3 DoF or 3 DoF+ environment may use modified apparatus and methods to produce similar advantages.

Furthermore one aspect of the embodiments is means and methods for saving bandwidth in 6 DoF content delivery, while still ensuring that with the delivered content an audio experience perceptually close to the one which would be obtained if the complete set would be delivered can be obtained. A MPEG-I perceptual scoping mechanism provides only a partial solution. For example if a subset of the complete scene is sent to the device memory and bandwidth savings are obtained, but problems with incomplete audio data occur when the user approaches (via zooming or translation or otherwise) the boundary of the perceptual scoping, and because of this the required set of audio elements can pass beyond the boundary of the perceptual scoping.

A specific case example may be where a user is configured to consume 6 DoF media content. The content may be audio-visual or audio only content. When the user moves in the content, the rendering and indeed also the audio set constitution adapt accordingly. The user can perform a zoom operation for example in the direction of an audio source/object, and the rendering may adapt according to known zooming mechanisms. This rendering may be possible, because the corresponding audio set is available.

Sometimes the user may wish to perform a significantly stronger zoom operation of the content. For example the zoom may focus on (an audio-wise) seemingly empty area of the current viewpoint or audio set in order to "scope the surroundings". In performing this there may be no immediate audio available to render the effect and be presented to the user. This is because the zoom effect is very strong and displaces the audio of the current set of audio elements outside the user's 'view'. This region or area outside of the user's 'view' may be known as or defined as the outside zone of the audio scene. In other words an outside zone can mean an area that is not available to the user (or area whose content (audio objects) are not immediately available to the user).

If the 'view' in a direction outside the current audio set is indeed empty, this is the correct approach. However, where there is further content beyond the audio set, this results in an incorrect rendering and at least a delay or a glitch in the audio playback, as audio from a separate audio set needs to be made available for rendering. Alternatively, the zooming results in no new audio being heard, which may a) misrepresent the content and b) make the user lose their interest in the particular direction and not continue to explore it.

From the point of view of the client/rendering device the embodiments as discussed herein attempt to allow the client to render a quality experience even where the client does not receive the complete 6 DoF audio scene. In such embodiments the client is able to render spatial audio signal from 6 DoF audio content comprising a subset of audio elements of a complete audio scene, so that the audio experience is perceptually close to one which would be obtained by rendering the spatial audio signal using the complete set of 6 DoF content, even if the user is allowed to perform free translation and/or zooming.

Figure 2A:
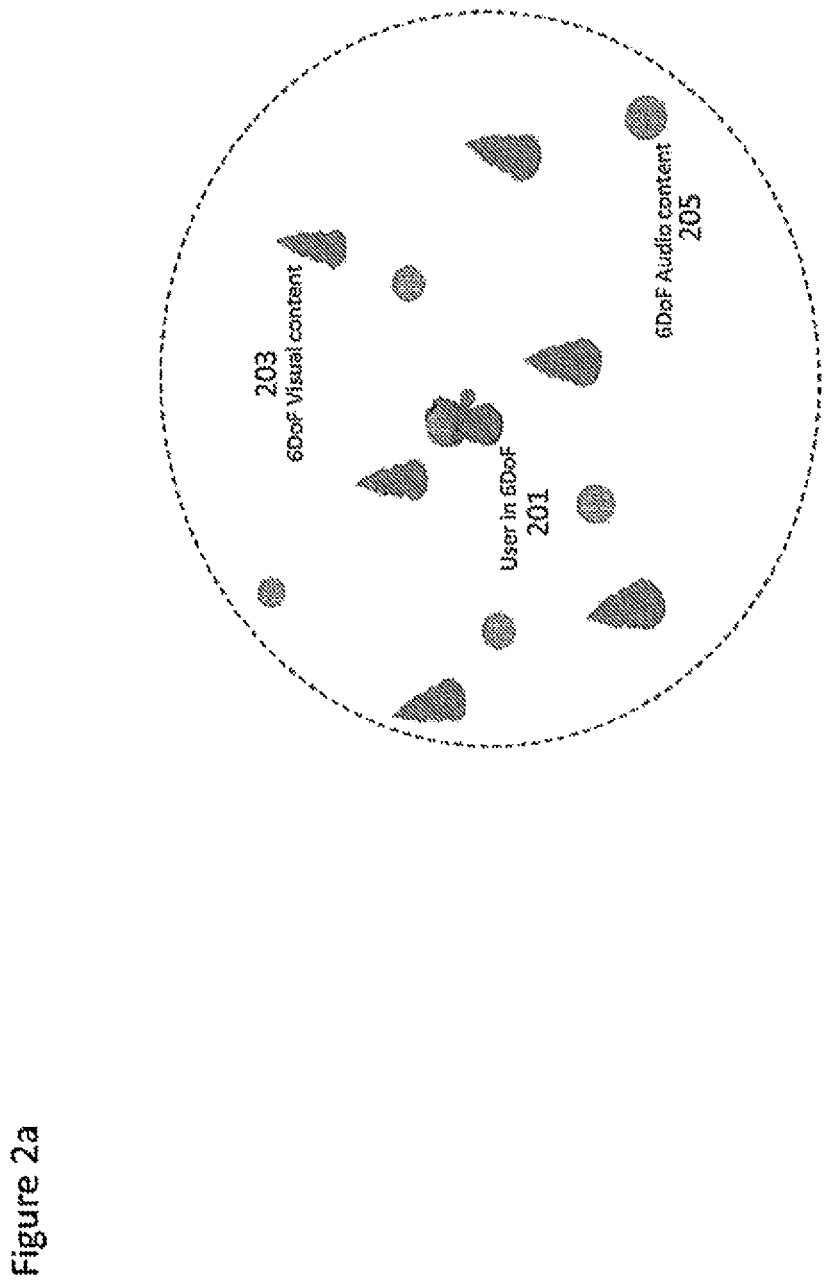
FIGS. 2a to 2g show examples of zooming and rotation within a VR/AR environment.

FIG. 2a for example shows an example 6 DoF example where the user 201 in a 6 DoF environment experiences 6 DoF visual content 203, such as the visual representations of the trees, and 6 DoF audio content 205, such as the audio objects shown by the circles within the 6 DoF environment. The user can experience a perceptual scope based on the user location (which may be a Cartesian representation x,y,z), the user orientation and the user direction of movement.

Figure 2C:
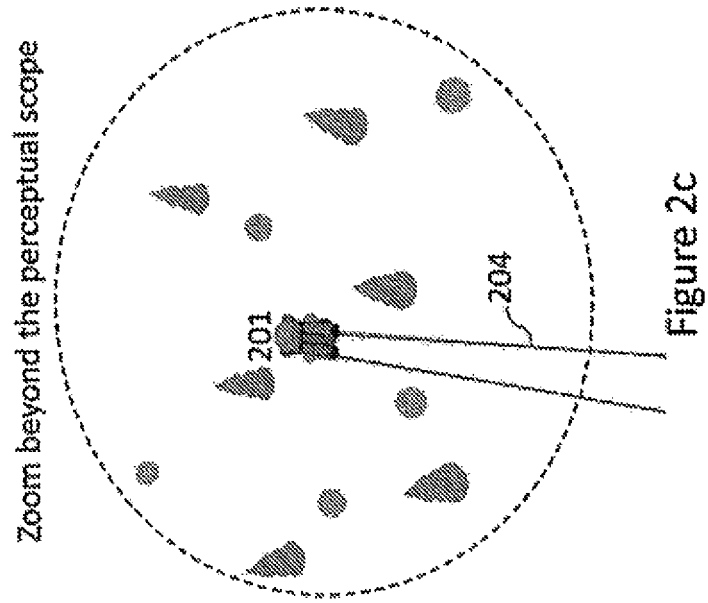
Figure 2B:
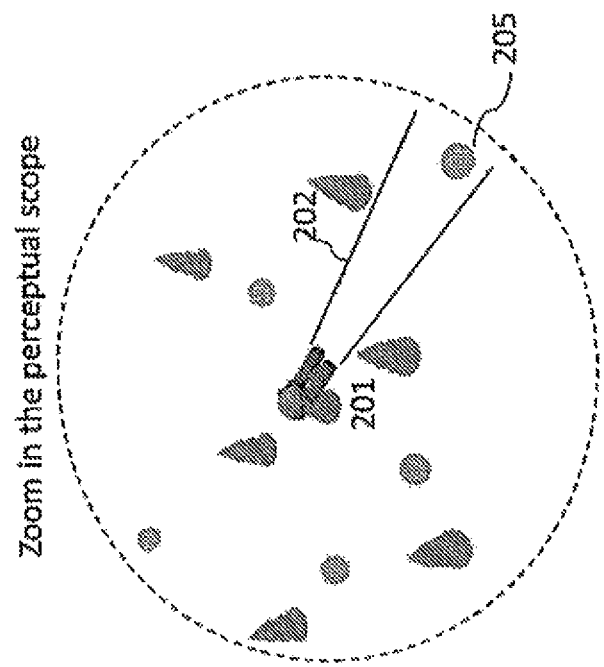

FIGS. 2b and 2c show the example 6 DoF 'perceptual scope'. FIG. 2b shows, for example, the user 201 having rotated to 'experience' the audio object 205 within the 'view' or 'perceptual scope' as shown by the lines 202. In such an example the client may be able to render the audio object provided it has been provided from the server. FIG. 2c shows a further example where the user 201 has moved and rotated and zoomed beyond the 'perceptual scope' and experiences a further 'perceptual scope' or 'view' as shown by the lines 204. The further 'perceptual scope' contains none of the audio objects provided to the client from the server and as such may be problematic for the conventional renderer.

Figure 2D:
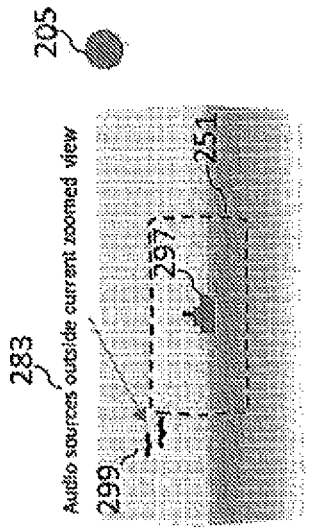

FIG. 2d shows for example a 'perceptual scope' example which shows that for an example 6 DoF environment there are audio sources within the current view 281. This for example may comprise a first audio object associated with the visual representations of the birds 299 and a second audio object associated with the visual representation of the ship 297. Additionally there may be audio sources outside of the current view, represented by circle 205. In this example the client may render the audio objects associated with ship 297 and birds 299.

Figure 2E:
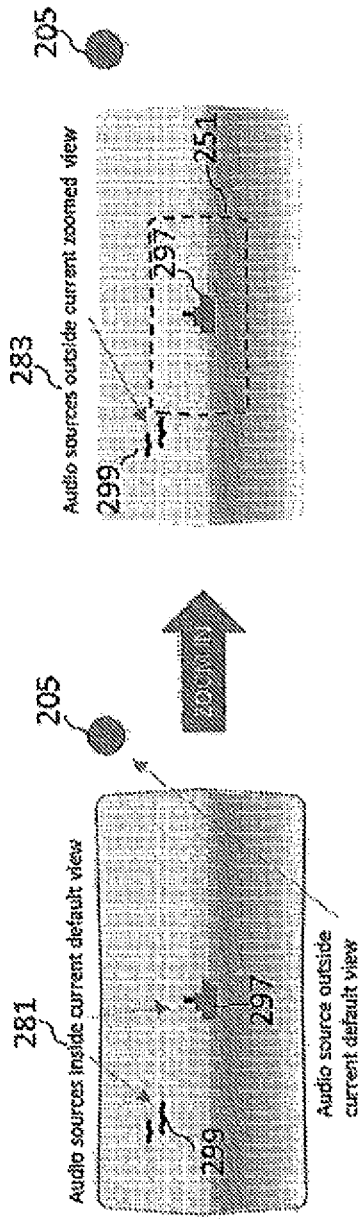

FIG. 2e shows furthermore a zoom operation which is applied by the user which produces a perceptual scope shown by the dashed box 251 and which now defines audio sources within the current view 283 comprising the second audio object associated with the visual representation of the ship 297 and audio source outside of the zoom operation view comprising the audio source represented by circle 205 and the audio object associated with the birds 299. In this example the client may render the audio objects associated with the ship 297 only.

Figure 2F:
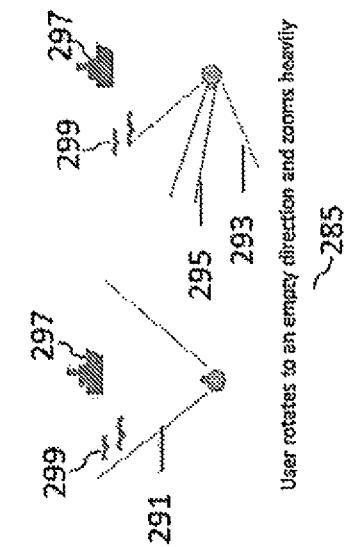

FIG. 2f shows the user experiencing a first orientation and zoom which would produce the perceptual scope as shown in FIG. 2d. Within the field of view of the user defined by the orientation and zoom operation and represented by the two lines 291 is the ship 297 and the birds 299. The right hand side of FIG. 2f shows the user rotating and performing an increased zoom operation 285 where the field of view of the rotation, shown by lines 293 and by the further zoom operation, shown by lines 295 creates an audio void in that there are no audio objects within the users perceptual scope. This rotation and zoom is likely to cause a conventional renderer to output no audio signals and therefore does not provide the user any new information or maintain the user's interest.

Figure 2G:
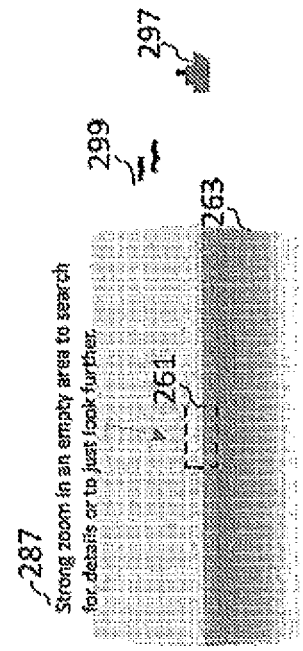

FIG. 2g shows the perceptual scope of the rotation 263, and the zooming (dashed box) perceptual scope 261 (which is shown in FIG. 2f by lines 293 and 295 respectively) and clearly shows the strong zoom into an empty area 287 away from the ship 297 and the birds 299.

The concept as discussed in the embodiments herein is one wherein apparatus and methods ensure a self-contained rendering inside a set of audio elements in MPEG-I.

The concept is one in which a set of audio elements are defined which represent a subset of a complete 6 DoF audio scene. The audio scene thus in some embodiments can be rendered using only the contained audio elements when the user listening position is inside the area defined by the set. The set of audio objects can be called the user's perceptual scope. However as discussed above, if because of user interaction there is a need to render audio content beyond the set of elements, the embodiments as discussed herein are able to determine this situation before the full content can be obtained.

In order to accomplish this in some embodiments a self-contained rendering of 6 DoF audio can be implemented by performing the following operations:

Obtaining user location and rotation;
Selecting a set of audio elements based on user location and rotation. This set of audio elements is now the user's perceptual scope;
Detecting at least one user action extending perceptual scope of playback in a way requiring at least one audio element not currently available;
Augmenting the set of audio elements by at least one auxiliary audio element providing a required extension of the perceptual scope; and
Rendering the augmented set of audio elements.

Therefore in some embodiments there is proposed an addition of one or more auxiliary audio element(s) to the self-contained set of audio elements. The one or more auxiliary audio elements are rendered only when content from outside of the self-contained set is required to be rendered (due to user action such as zooming). The auxiliary audio element is not rendered when the user is in the area defined by the set.

Furthermore in some embodiments when the content in another set becomes available, the rendering is configured to perform a crossfade from rendering the auxiliary audio elements to the full sound elements of the other set.

The concept can be viewed as a client apparatus part and a server part. The combination of the client and the server may be implemented as part of a system.

The server apparatus part in some embodiments is configured to create self-contained sets of audio elements or objects. Furthermore these sets of audio elements are augmented with auxiliary audio objects. The auxiliary audio elements can be downmixed or otherwise combined versions of audio elements which fall outside the self-contained set.

The generation of the augmentation or auxiliary audio elements may in some embodiments feature the following operations:

obtaining a 6 DoF audio scene containing audio elements and their position data;
dividing the 6 DoF audio scene into subsets where in each subset the number of audio elements is less than in the complete audio scene and where the subsets together represent the complete 6 DoF audio scene;
for each of the subsets, obtaining one or more audio element(s) outside the subset, and creating an auxiliary audio element to complement the set;
making the subsets available for rendering by client devices.

Thus the embodiments aim to add auxiliary audio elements to represent the audio scene outside the set elements, and make these available for rendering the portion of the audio scene outside the elements. In such a manner the embodiments are able to advantageously handle user translation and/or zooming operations even where there has been delivered an incomplete set of audio elements. In such a manner it may be possible to make a sufficient representation of audio content outside the perceptual scope available at the client.

The client apparatus part side in some embodiments is configured to provide a rendering method which may comprise the following operations:

obtaining user position and orientation;
obtaining a 6 DoF audio scene subset associated with the position and orientation;
rendering a spatial audio signal to the user using the audio elements in the subset when the user position and orientation does not substantially deviate from the centre of the subset; and
rendering a spatial audio signal to the user using the audio elements in the subset and at least one auxiliary audio element associated with the set when the user position and orientation substantially deviates from the centre of the subset.

In some embodiments the client apparatus may further be configured to determine where a substantial deviation of the user from the centre of the subset may also trigger the download of another subset of audio elements.

The embodiments as discussed herein can be implemented as part of a 6 DoF media content framework. The 6 DoF media content representation can be a multi-viewpoint representation or any 6 DoF representation that support sets of audio elements. Such self-contained sets of audio elements can correspond, e.g., to what a user is able to, or potentially able to, hear according to a location (x,y,z), orientation, or direction of movement. The implementation can be part of a standard such as MPEG-I 6 DoF Audio standard.

Some embodiments may be implemented also in a content authoring tool such as an audio editing and authoring software running on a Digital Audio Workstation (DAW). Some embodiments may be furthermore be implemented in a 6 DoF media content or 6 DoF audio rendering software or a device. Examples of such devices include a virtual reality (VR) device that may consists of at least a head mounted device (HMD) and/or a server, and an augmented reality (AR) audio or AR audio-visual device that may represent, for example a new wearable mobile device form factor.

In some embodiments there is included in the content (created during the content creation/authoring) or alternatively created on-the-fly by the system (based at least on the current audio set) a set of auxiliary (downmix) audio elements that can be used in the rendering when a user zooms, or otherwise indicates a rendering, beyond the perceptual scope given by the first set of audio elements.

These auxiliary (downmix) audio elements can be rendered with a spatial extension and with an increasing gain, when the zooming action intensifies.

Figure 3B:
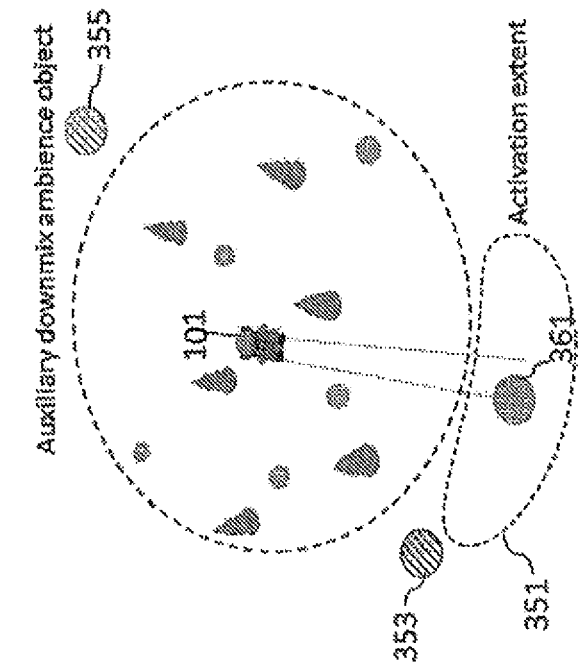
FIG. 3b shows schematically a user view of perceptual scope/content the example shown in FIG. 2c with auxiliary audio elements according to some embodiments.
Figure 3A:
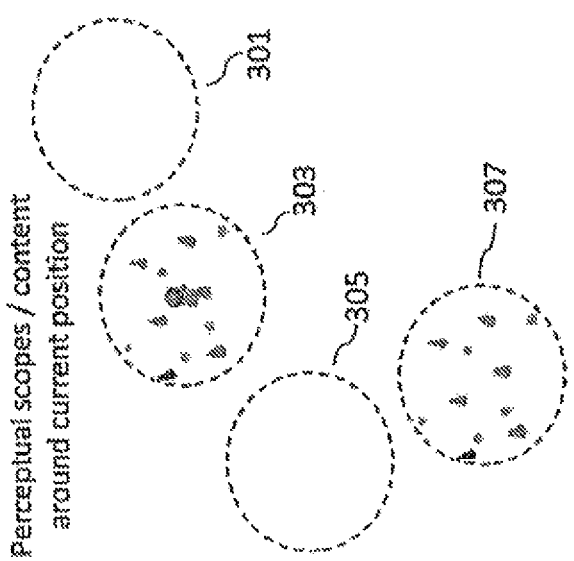
FIG. 3a shows schematically a user view of perceptual scope/content around a current position of a user for the example shown in FIG. 2c.

FIGS. 3a and 3b show embodiments implementing the auxiliary (downmix) ambience objects described herein in order to produce the advantageous effects mentioned. The auxiliary audio is not part of the default playback associated with the user's current location (x,y,z), orientation, or direction of movement. The auxiliary audio is therefore in some embodiments used for augmenting the current perceptual scope where a user interaction such as the audio, visual, or audio-visual zoom and the related audio rendering modification requires rendering audio elements beyond the perceptual scope.

FIG. 3a for example shows three directions with additional perceptual scopes 301, 305, 307 or content around the user's current perceptual scope 303. (In some embodiments, at least some perceptual scopes can at least partially overlap in location.) These surrounding perceptual scopes 301, 305, 307 or contents can be downmixed (or otherwise combined) into an auxiliary audio element that is by default not rendered. When a user accesses, for example, an activation extent of at least one auxiliary audio element, however, it can be presented to the user.

This is illustrated in FIG. 3b which shows audio objects 353, 355 and an auxiliary audio element 361. The auxiliary audio element 361 has an associated activation extent 351. The activation extent 351 defines an orientation or position range. When the user is perceptual scoping within this range the auxiliary audio element 361 is rendered, when the user is scoping outside of the range the auxiliary element is not rendered.

In some embodiments, the audio playback enhancement over the first set of audio elements can relate only to addition of the auxiliary (downmix) audio elements.

In some embodiments a first rendering of the auxiliary (downmix) audio elements commences to retrieve, for example, by downloading at least one audio element of a second set of audio elements corresponding to a next perceptual scope according to the zooming target direction, or amount of change of the zooming. In these embodiments, the rendering of the auxiliary (downmix) audio elements therefore provides the system further time to retrieve the necessary additional audio elements. When the at least one audio element of a second set of audio elements required for the audio rendering according to the zooming is available, the rendering can transition to rendering the audio and fade out the rendering of the auxiliary (downmix) audio elements.

Figure 4:
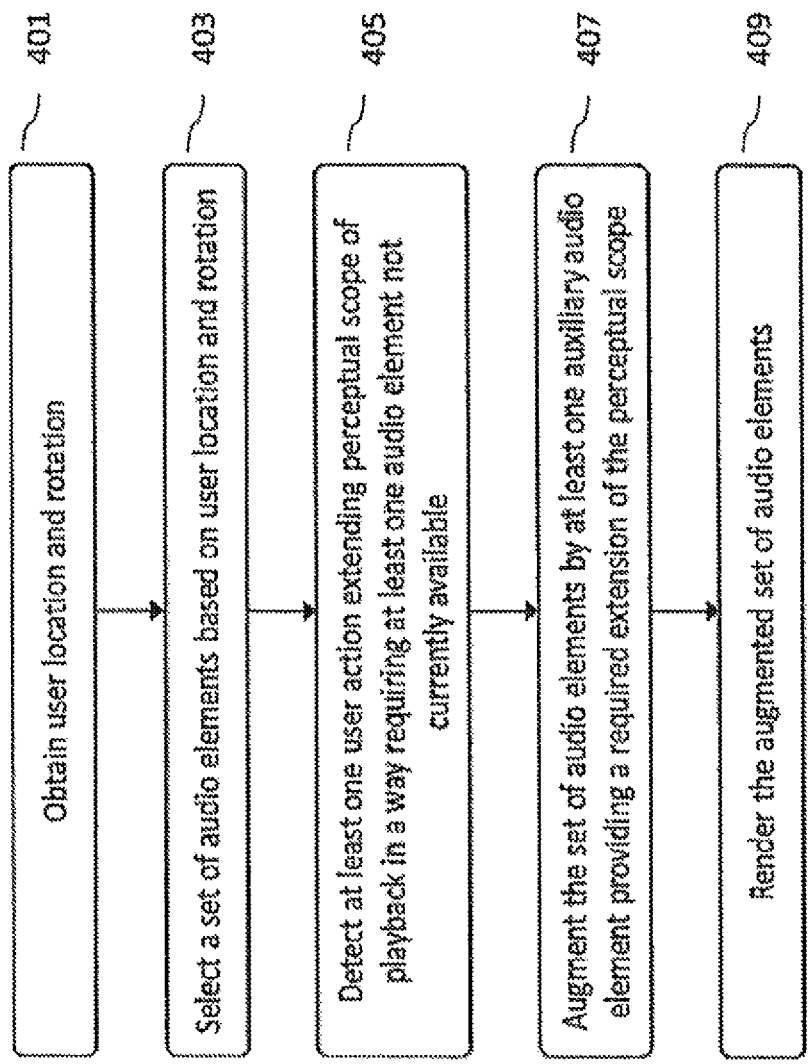
FIG. 4 shows a flow diagram of the operations of a system suitable for implementing some embodiments.
Figure 5:
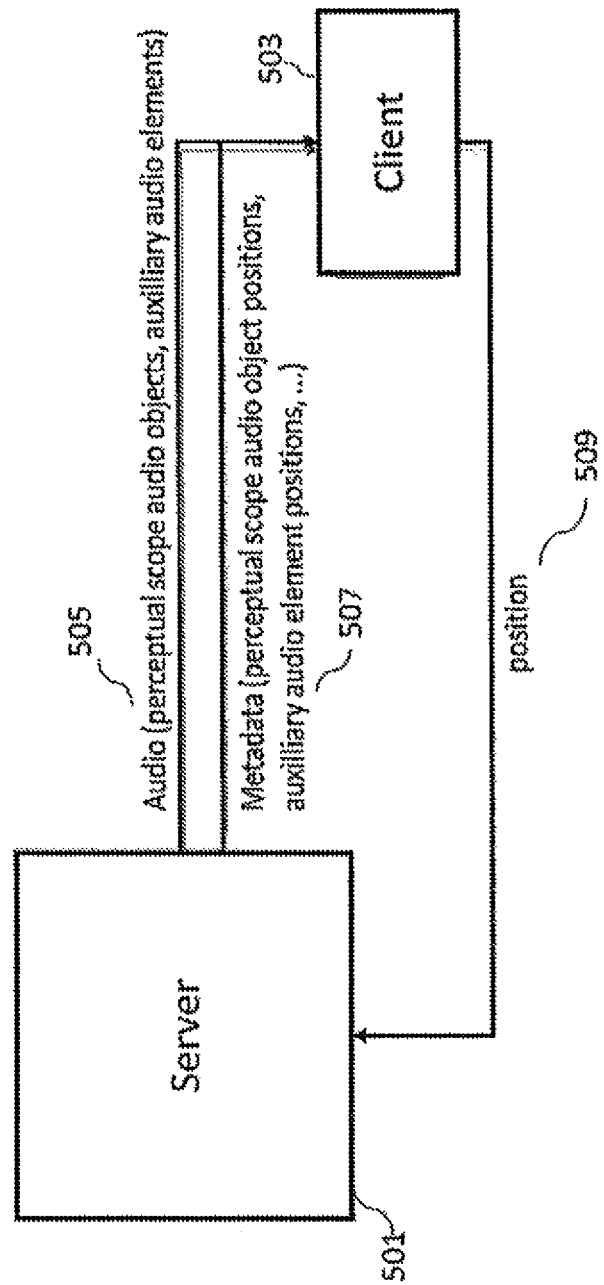
FIG. 5 shows schematically a server-client system suitable for implementing some embodiments.

The apparatus and operations which summarise the embodiments are shown with respect to FIGS. 4 and 5.

FIG. 5 for example shows a server 501 and client 503 apparatus which are configured to communicate with each other. For example the client 503 is configured to communicate to the server 501 information as to the user position and/or orientation via communication channel 509. The server 501 is configured to communicate to the client 503 audio such as the perceptual scope audio objects and the auxiliary audio elements via a first audio channel 505 and perceptual scope audio object positions and auxiliary audio element positions via a metadata channel 507. In some embodiments these channels may be combined.

The summary of the operation as shown in FIG. 4 in some embodiments can comprise the following operations:

1. Obtain user location and rotation: The user's location and rotation is obtained using whatever user tracking method the system is using. For example, the user could be using an Android phone to experience AR content and the phone's AR Core functionality provides the user's position (and orientation) to the system. This is shown in FIG. 4 by step 401.
2. Select a set of audio elements (perceptual scope) based on user location and rotation. Once the user's location (and orientation) is known, the system can be configured to determine which audio objects the user should hear from his current location. These audio objects comprise the user's perceptual scope. There may be several pre-determined sets of audio objects in the scene. The system then selects one of the pre-determined sets to be the user's current perceptual scope by, for example, calculating the distance to the centres of the pre-determined sets from the user's current location. The pre-determined set, whose centre is closest to the user is selected. The centre of a pre-determined set is the "average position" of the audio objects in the set. This is shown in FIG. 4 by step 403.
3. Detect at least one user action extending beyond perceptual scope of playback in a way requiring at least one audio element not currently available. For example the user can perform a user interaction, such as zooming towards an audio object that is not in his current perceptual scope. The zoom operation can be a conventional optical zoom but may also could be a situation when the user moves (walks or runs) beyond the current perceptual scope too fast (in which case rendering the auxiliary audio elements temporarily would provide a smooth transition until the actual elements of the new perceptual scope can be obtained). This detecting or determination is shown in FIG. 4 by step 405.
4. Augment the selected set of audio objects by at least one auxiliary audio element providing a required extension of the perceptual scope. In such embodiments a new audio object is added to the selected set of audio objects (the user's current perceptual scope). The added audio object is an auxiliary audio element which is a downmix (or otherwise combination) of one of the pre-determined audio object sets. In one example, the perceptual scope for which the downmix is selected is the one that contains the audio object the user was zooming towards. This augmentation is shown in FIG. 4 by step 407.
5. Render the augmented set of audio elements. The audio objects within the selected audio object set (perceptual scope) can be rendered as is. The auxiliary audio element is rendered from the direction of the audio object set it represents. The rendering is shown in FIG. 4 by step 409.

Figure 6:
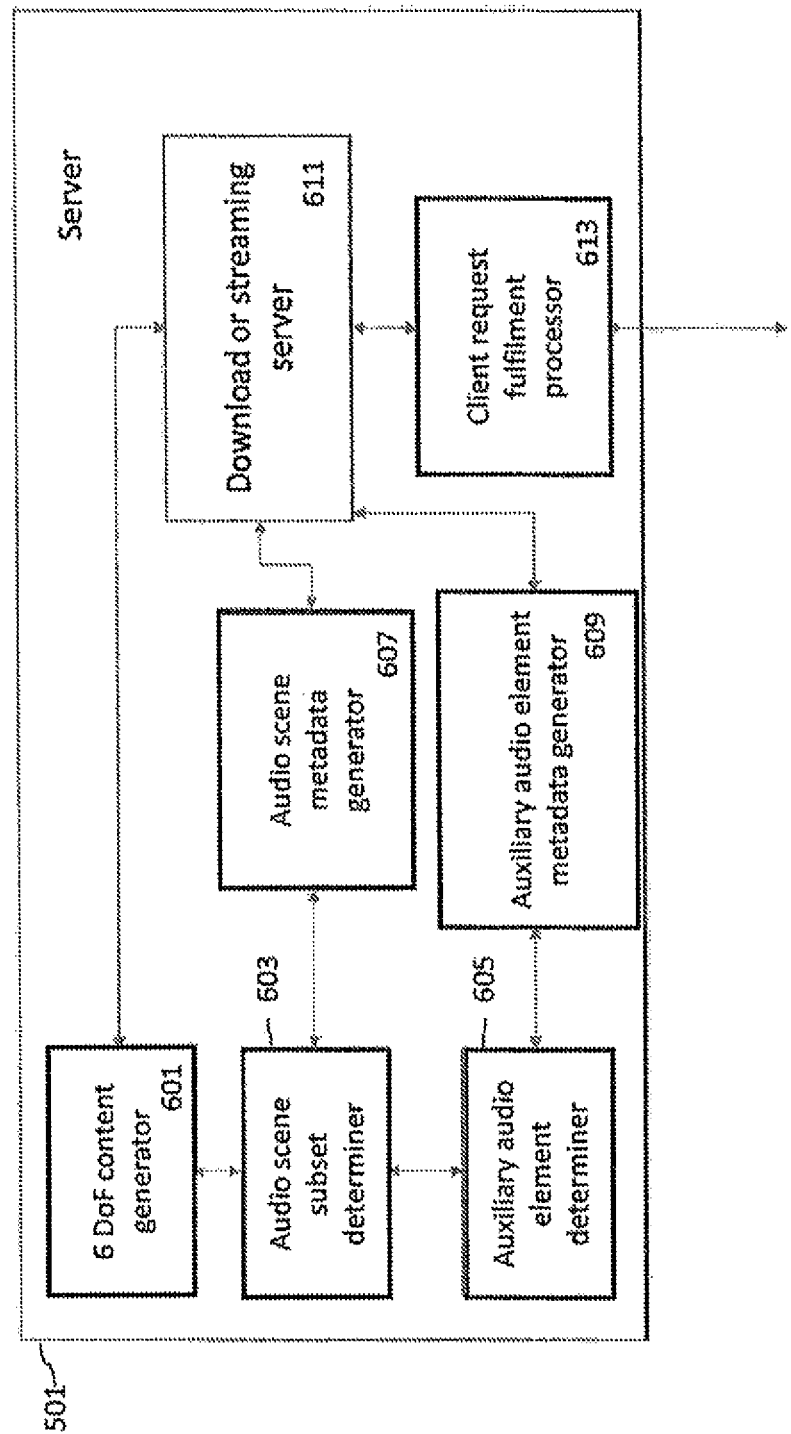
FIG. 6 shows schematically a server suitable for implementing some embodiments as shown in FIG. 5.
Figure 8:
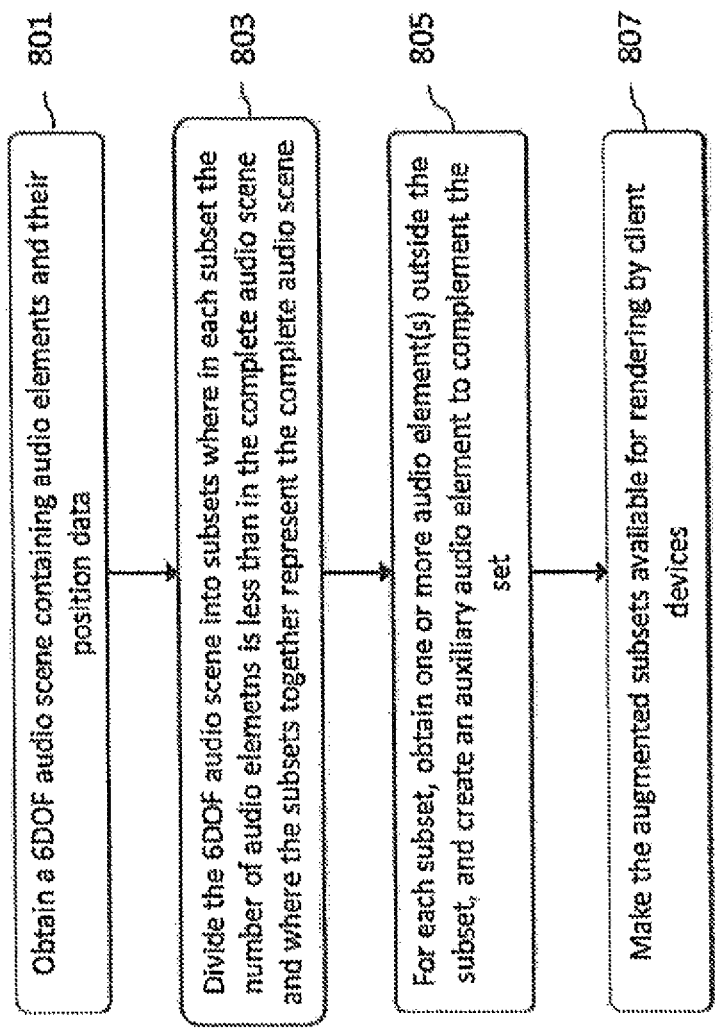
FIG. 8 shows a flow diagram of the operation of the server shown in FIG. 6 according to some embodiments.

With respect to FIGS. 6 and 8 is shown the server and operations of the server in further detail.

The server 501 in some embodiments comprises a 6 DoF content generator 601. The 6 DoF content generator 601 is configured to generate suitable 6 DoF content and supply this to the download or streaming server 611. The 6 DoF content generator 601 is furthermore configured to generate the 6 DoF content based on inputs from the audio scene subset determiner 603.

The server 501 in some embodiments comprises an audio scene subset determiner 603. The audio scene subset determiner 603 is configured to determine which audio scene audio objects and auxiliary elements can be passed to the 6 DoF content generator 601 to generate the 6 DoF content. Furthermore the audio scene subset determiner 603 is configured to determine this based on information from the auxiliary audio element determiner 605 and the audio scene metadata generator 607.

The server 501 in some embodiments comprises an audio scene metadata generator 607. The audio scene metadata generator 607 is configured to generate the metadata associated with the audio objects and audio scene, for example the position of the audio objects. This metadata information, in some embodiments, is passed to the audio scene subset determiner 603 to assist in the determination of the audio scene components and to the download or streaming server 611 for combining with the audio output from the 6 DoF content generator 601.

The server 501 in some embodiments comprises an auxiliary audio element determiner 605. The auxiliary audio element determiner 605 in some embodiments is configured to provide auxiliary audio elements to the audio scene subset determiner in order to assist in the determination of the audio scene components. Furthermore the auxiliary audio element determiner 605 is configured to communicate with the auxiliary audio element metadata generator 609 and receive information as to the placement or range or extent of the application of the auxiliary elements.

The server 501 in some embodiments comprises an auxiliary audio element metadata generator 609. The auxiliary audio element metadata generator 609 is configured to generate metadata associated with the auxiliary audio elements, such as the range or extent of the application of the auxiliary audio elements, the position of the auxiliary audio elements and other associated information. In some embodiments this is passed to the download or streaming server 611 to be passed to the client with the audio objects and the auxiliary audio elements. Furthermore in some embodiments this information may by passed to the auxiliary audio element determiner 605 to assist in the generation of the auxiliary audio elements or objects.

The server 501 in some embodiments comprises a download or streaming server 611. The download or streaming server 611 is configured to receive the 6 DoF content from the 6 DoF content generator 601, metadata associated with the audio objects from the audio scene subset metadata generator 607 and metadata associated with the auxiliary audio elements from the auxiliary audio element metadata generator 609. This may be encoded in some embodiments and passed to a client request fulfilment processor 613.

The server 501 in some embodiments comprises a client request fulfilment processor 613 which may for example receive information with respect to the user position and/or orientation and zoom factor or field of 'view'. Furthermore these may be communicated to the download or streaming server and based on this information be able to receive the relevant 6 DoF content comprising audio objects, scene based audio such as FDA or HOA, or channel bed and the auxiliary audio elements and the associated metadata and communicate with the client these.

In other words the server is configured to deliver or make content accessible to the client. The content that is sent is based on the position of the client (user) in the content: the server sends audio content from within the user's perceptual scope and in addition auxiliary audio elements representing the other perceptual scopes to the client. The client then renders the content to the user based on its position and any interactions done by the user.

FIG. 8 furthermore depicts the steps of the method on the server.

1. Obtain a 6 DoF audio scene containing audio elements and their position data. The 6 DoF audio scene contains 6 DoF audio in some suitable format; for example, as MPEG-H 3D encoded audio waveforms plus metadata enabling 6 DoF rendering. Any other suitable audio encodings can be used. Metadata enabling 6 DoF rendering comprises at least the position (x,y,z) for sound elements. Position can alternatively be determined with polar coordinates with (azimuth, elevation, radius). Optionally, other parameters such as sound element orientation (azimuth, elevation), or extent or size can also be included. Optionally, other parameters describing the acoustic scene such as reverberation characteristics can be included. This can for example be generated by the 6 DoF content generator 601 as shown in FIG. 6. This obtaining or determining of the 6 DoF content is shown in FIG. 8 by step 801.

2. Divide the 6 DoF audio scene into subsets where in each subset the number of audio elements is less than in the complete audio scene and where the subsets together represent the complete audio scene. The division can be done by clustering the sound element positions to clusters of desired size (k), using the k-means clustering algorithm. Such an algorithm starts by randomly selecting k initial cluster centres, and then repeating a process of allocating the element positions to the nearest cluster centre and updating the centres to correspond to the mean of the positions of audio elements assigned to each centre. Other clustering algorithms or other principles of allocating sound elements to perceptual scopes can be used instead. In some alternative embodiments, the perceptual scopes are manually created by the content creator. This can for example be performed within the audio scene subset determiner 603 and the audio scene subset metadata generator 607 as shown in FIG. 6. This dividing is shown in FIG. 8 by step 803.

3. For each subset, obtain one or more audio element(s) outside the subset, and create an auxiliary audio element to complement the set. An element of the embodiments is the identification of sound elements outside the subset (the outside zone of the audio scene), and creating auxiliary audio elements from the outside audio elements. The principle is that as shown in FIGS. 3a and 3b. This may be performed in the auxiliary audio element determiner 605 and auxiliary audio element metadata generator 609 as shown in FIG. 6. Furthermore the obtaining or determining of the auxiliary audio elements is shown in FIG. 8 by step 805. In some embodiments the identification may be performed as follows:

a. Divide the subset into spatial sectors around its origin (cluster centre) with each sector having a certain width such as 45 degrees b. For each sector, perform the following:

i. Obtain audio elements outside the subset (the outside zone) within the sector and optionally within a certain radius threshold from the subset centre ii. Create a downmix of the identified audio elements iii. Associate the downmix as an auxiliary audio element to the spatial sector of the subset Thus, the result of this is that for each spatial sector around the subset there will be an associated (downmix) auxiliary audio element. In some embodiments the auxiliary (downmix) audio elements may be created as downmixes of elements of the nearest perceptual scope (subset) at each spatial direction around the subset. In some further embodiments the auxiliary (downmix) audio elements may be created using the direct or ambient part of audio elements outside the subset. The selection depends on whether the system wants to emphasize the direct or ambient portion of sounds outside the subset, when needed. In some embodiments the direct portion is represented by the audio objects in a set and the ambient portion by the scene-based audio elements or the channel bed.

4. Make the augmented subsets available for rendering by client devices. The system stores the subsets and the associated auxiliary audio elements to be downloaded or streamed by client devices. The data contains the encoded audio waveforms, metadata indicating audio waveform formats and positions, division of the scene into subsets and enabling downloading or streaming the scene one subset at a time. Moreover, each subset is complemented with created auxiliary audio elements which are associated to different spatial sectors around each subset. This may be performed by the download or streaming server 611 and the client request fulfilment processor 613. The operation of making the augmented subsets available is shown in FIG. 8 by step 807.

Figure 7:
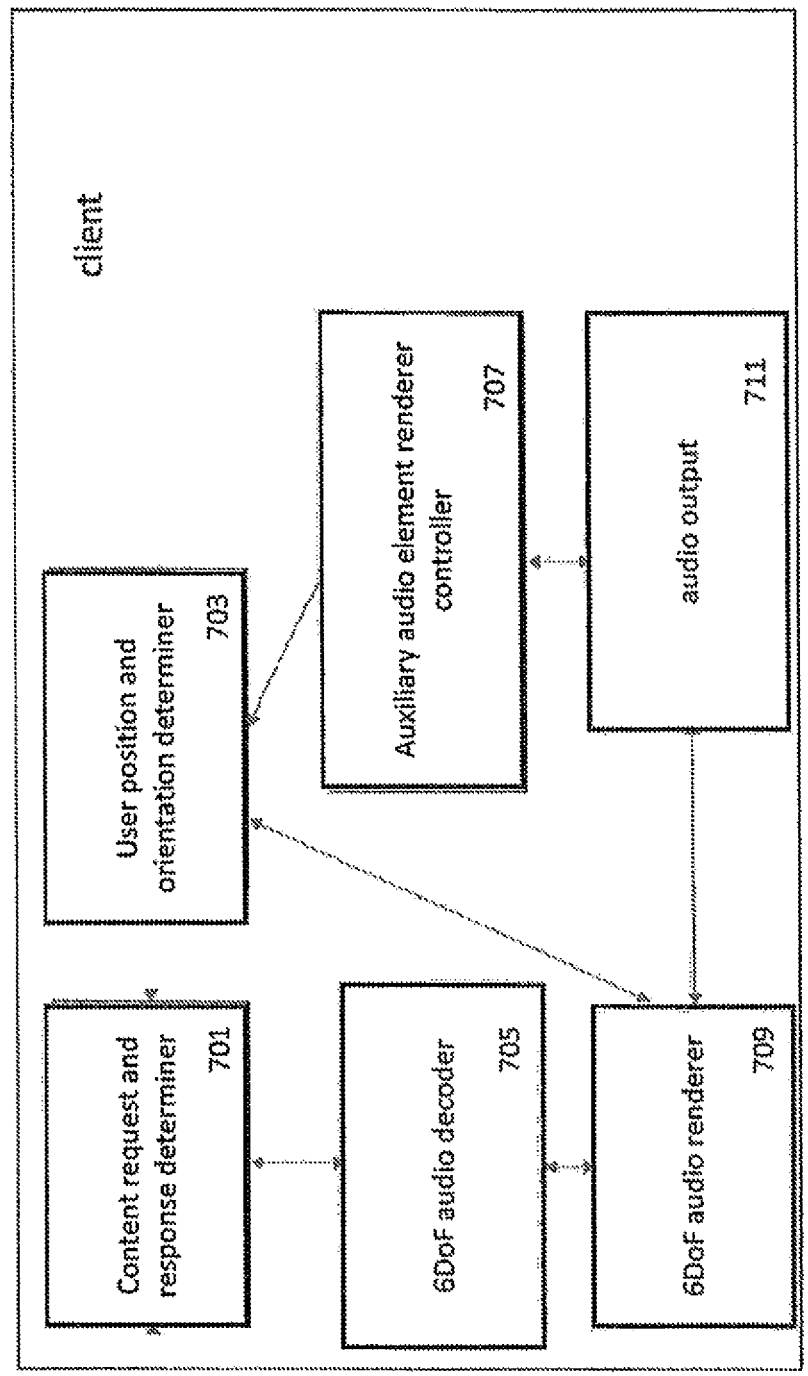
FIG. 7 shows schematically a client (playback/synthesis device) suitable for implementing some embodiments as shown in FIG. 5.
Figure 9:
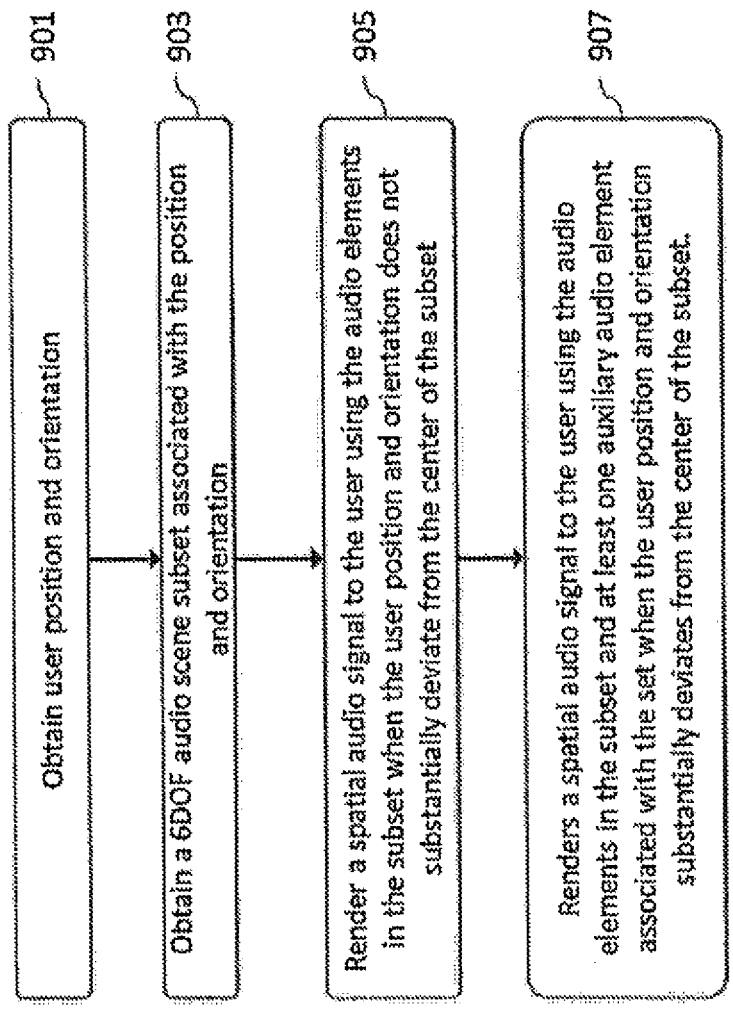
FIG. 9 shows a flow diagram of the operation of the client shown in FIG. 7 according to some embodiments.

With respect to FIGS. 7 and 9 are shown the client device and the main steps of the method in the client device.

The client 503 in some embodiments comprises a content request and response determiner 701. The content request and response determiner 701 is configured to communicate with the server, for example to pass the user position and/or orientation information to the server and to request augmented audio and metadata associated with the augmented audio. Furthermore the content request and response determiner 701 can be configured to receive from the server augmented audio and metadata associated with the augmented audio.

The client 503 in some embodiments comprises a user position and orientation determiner 703. The user position and orientation determiner 703 is configured to obtain position and/or orientation information which may be passed to the content request and response determiner 701 (for passing to the server) and furthermore in some embodiments to the auxiliary audio element renderer controller 707 and the 6 DoF audio renderer 709.

The client 503 in some embodiments comprises a 6 DoF audio decoder 705 configured to receive the augmented audio and metadata from the content request and response determiner 701. The 6 DoF audio decoder 705 is furthermore configured to decode the audio signals and metadata from the received augmented audio and metadata and pass this to the 6 DoF audio renderer 709.

The client 503 in some embodiments comprises an auxiliary audio element renderer controller 707. The auxiliary audio element renderer controller 707 is configured to receive information from the user position and orientation determiner 703 and control the rendering of the audio signals using the auxiliary audio elements based on the user position and/or orientation and furthermore the metadata associated with the auxiliary audio elements defining the range or scope of the auxiliary audio elements. The auxiliary audio element renderer controller 707 in some embodiments is configured to control the audio output.

The client 503 in some embodiments comprises a 6 DoF audio renderer 709. The 6 DoF audio renderer 709 is configured to render the 6 DoF audio signals suitable for the audio output 711.

The client 503 in some embodiments comprises an audio output 711. The audio output 711 is configured to receive the 6 DoF rendered signals and output this to the user.

The client method may in some embodiments may be shown for example in FIG. 9 by the following operations:

1. Obtain user position and orientation. This can be obtained from a head tracking device or head mounted device, manually input by the user or via other means. This is shown in FIG. 7 by the user position and orientation determiner 703. The operation of obtaining the user position and/or orientation is shown in FIG. 9 by step 901.

2. Obtain a 6DoF audio scene subset associated with the position and orientation. The basic selection for an audio scene subset for a user position (x, y, z) is the subset within which the user position (x, y, z) falls within. If the user position is within a predefined threshold from a boundary of an audio scene subset, then the user orientation can be used for determining the subset which should be accessed, at the direction headed by the user. The obtaining of the 6 DoF audio scene subset may be performed by the content request and response determiner 701 and the 6 DoF audio decoder 705. The obtaining of the 6 DoF audio scene subset is shown in FIG. 9 by step 903.

3. Render a spatial audio signal to the user using the audio elements in the subset when the user position and orientation does not substantially deviate from the centre of the subset. When the user position is within a predefined threshold from the subset centre, the audio can be rendered with 6 DoF audio rendering means using the audio elements in the subset, without using the auxiliary audio elements. A suitable threshold can be, for example, 75% of the radius of the audio element subset radius. The rendering can be implemented in some embodiments within the 6 DoF audio renderer 709. The rendering is shown in FIG. 9 by step 905.

4. Render a spatial audio signal to the user using the audio elements in the subset and furthermore using the at least one auxiliary audio element associated with the subset when the user position and orientation substantially deviates from the centre of the subset. Thus when the user position substantially deviates from the subset centre, or user otherwise performs an interaction or via other means causes the need to render content at the boundary and beyond the subset, the system accesses the auxiliary audio element from the corresponding spatial sector of the audio scene subset. The rendering of the auxiliary audio elements in this case is as described above. The rendering can be implemented in some embodiments within the auxiliary audio element render controller 707. The rendering is shown in FIG. 9 by step 907.

In some embodiments the auxiliary (downmix) audio elements can also be applied for rendering when the user, for example, walks close to a corresponding boundary of the current perceptual scope where no additional audio is yet available.

Considering the above use case in some embodiments the auxiliary audio elements can thus be utilized for example to reduce complexity and/or transmission of audio data where the system is at least temporarily constrained.

Thus, in some embodiments, a decision to download new content may be delayed based at least on a certainty metric of user transitioning across at least one boundary between perceptual scopes or, for example, viewpoints relating to at least two self-contained sets of audio elements.

The auxiliary (downmix) audio elements can be implemented in any suitable format. For example they may be implemented as sound objects, in which case they can be spatially extended to enable the user to hear them from a larger spatial area. In some other embodiments, they are implemented as scene based audio. For example the auxiliary audio elements such as first-order-ambisonics (FOA) or higher-order-ambisonics (HOA). In this case, the auxiliary (downmix) audio elements are a scene-based audio representation which surrounds the user's perceptual scope, but is not rendered until the user performs the interaction which requires rendering beyond the current perceptual scope. Furthermore, when the auxiliary audio elements are FOA or HOA, special processing can be used to emphasize a certain direction of the auxiliary audio elements depending on user zoom direction. For example, a spatial zoom or focus or translation effect can be applied to the desired direction of the FOA or HOA content when the user is performing a zoom towards that direction.

When delivering content from a server, each set of audio elements can automatically contain the created auxiliary (downmix) audio elements from outside audio element sets. This way, the auxiliary audio content is already available in the consuming client when the rendering of a set commences. The auxiliary (downmix) audio elements can be used to render the content outside the current perceptual scope when needed. As discussed above this may be known as or defined as the outside zone, an area that is not available to the user or area whose content (audio objects) are not immediately available to the user. When the user transits fully or substantially close to another perceptual scope, the audio elements of the next perceptual scope are obtained and rendered.

In some embodiments, the audio playback enhancement over the first set of audio elements can relate to the addition of the auxiliary (downmix) audio elements.

In further embodiments, the system upon a first rendering of the auxiliary (downmix) audio elements commences to retrieve, e.g., by downloading at least one audio element of a second set of audio elements corresponding to a next perceptual scope according to the zooming target direction, or amount of change of the zooming. In these embodiments, the rendering of the auxiliary (downmix) audio element therefore at least provides time for the system to retrieve the necessary additional audio elements. When the at least one audio element of a second set of audio elements required for the audio rendering according to the zooming is available, the rendering can transition to rendering the said audio and fade out the rendering of the auxiliary audio elements.

Figure 10:
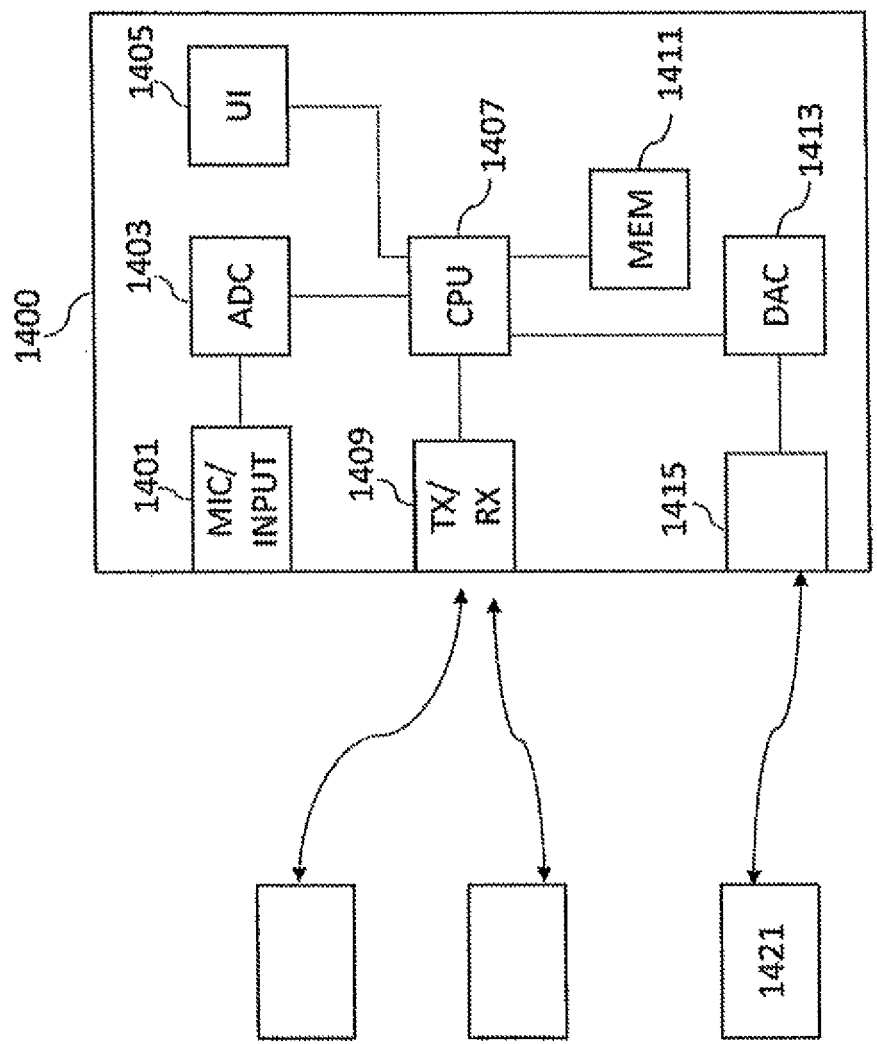
FIG. 10 shows schematically an example device suitable for implementing the apparatus shown in FIGS. 1, 5, 6 and 7.

With respect to FIG. 10 an example electronic device which may be used as the content client device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the loudspeaker signals and in some embodiments determine the parameters as described herein by using the processor 1407 executing suitable code. Furthermore the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
   at least one processor; and
   at least one memory storing instructions that, when executed with the at least one processor, cause the apparatus to perform:
   based upon a determination that a user is at a first position relative to an audio scene, using a subset of audio elements of the audio scene to render a first spatial audio signal, where the subset comprises one or more of the audio elements of the audio scene and is less than all of the audio elements of the audio scene; and
   based upon a determination that the user is at a second different position relative to the audio scene:
   determining at least one auxiliary audio element based upon the second different position of the user, and
   using the subset of audio elements and the at least one auxiliary audio element to render a different second spatial audio signal.

2. The apparatus as claimed in claim 1 where the positions comprises at least one of:
   a user location in the audio scene, or
   a user orientation in the audio scene.

3. The apparatus as claimed in claim 1 where the at least one auxiliary audio element is at least one of:
   outside of a perceptual scope of the audio scene; or
   associated with at least a part of the audio scene and is located at an area outside of the audio scene.

4. The apparatus as claimed in claim 1 where the determination that the user is at the first position comprises determining that the user is within a range relative to a determined location of the audio scene.

5. The apparatus as claimed in claim 4 where the determined location is a center of the subset of the audio elements.

6. The apparatus as claimed in claim 4 where the range comprises the user not being outside of a substantial deviation from the determined location.

7. The apparatus as claimed in claim 1 where the at least one memory stores instructions that, when executed with the at least one processor, cause the apparatus to:
   based upon a determination that the user is at a third different position relative to the audio scene, where the third different position comprises a perceptual scope of another at least partially different audio scene, render a different third spatial audio signal using a subset of audio elements of the another audio scene which includes the at least one auxiliary audio element as an audio element of the another audio scene.

8. The apparatus as claimed in claim 7 where the at least one memory stores instructions that, when executed with the at least one processor, cause the apparatus to:

render the different second spatial audio signal, comprising use of the subset of audio elements of the audio scene, until it is determined that the user has moved from the second position to the third different position.

9. The apparatus as claimed in claim 1 where the second different position comprises at least one of a zoom via the first position or a move action relative to the first position.

10. The apparatus as claimed in claim 1 where the at least one memory stores instructions that, when executed with the at least one processor, cause the apparatus to:
determine a plurality of sets of audio elements within the audio scene, wherein the plurality of sets of audio elements have an associated location within the audio scene;
calculate a distance between an obtained location associated with the user and respective other locations of the respective sets of audio elements; and
select at least one of the audio elements from the plurality of sets of audio elements based on the distance between the obtained location associated with the user and the other location of the respective at least one audio elements.

11. The apparatus as claimed in claim 1 where the audio scene comprises at least one of:
a six degree of freedom (6DOF) audio scene, or
audio waveforms as audio elements and metadata comprising position information.

12. A method comprising:
based upon a determination that a user is at a first position relative to an audio scene, using a subset of audio elements of the audio scene to render a first spatial audio signal, where the subset comprises one or more of the audio elements of the audio scene and is less than all of the audio elements of the audio scene; and
based upon a determination that the user is at a second different position relative to the audio scene:
determining at least one auxiliary audio element based upon the second different position of the user, and
using the subset of audio elements and the at least one auxiliary audio element to render a different second spatial audio signal.

13. The method as claimed in claim 12 where the positions comprises at least one of:
a user location in the audio scene, or
a user orientation in the audio scene.

14. The method as claimed in claim 12 where the at least one auxiliary audio element is outside of a perceptual scope of the audio scene.

15. The method as claimed in claim 12 where the at least one auxiliary audio element is associated with at least a part of the audio scene and is located at an area outside of the audio scene.

16. The method as claimed in claim 12 where the determination that the user is at the first position comprises determining that the user is within a range relative to a location of the audio scene.

17. The method as claimed in claim 16 where the location is a center of the subset of the audio elements.

18. The method as claimed in claim 16 where the range comprises the user not being outside of a substantial deviation from the determined location.

19. The method as claimed in claim 12 further comprising:
based upon a determination that the user is at a third different position relative to the audio scene, where the third different position comprises a perceptual scope of another at least partially different audio scene, rendering a different third spatial audio signal using a subset of audio elements of the another audio scene which includes the at least one auxiliary audio element as an audio element of the another audio scene.

20. The method as claimed in claim 19 further comprising:
rendering the different second spatial audio signal comprising use of the subset of audio elements of the audio scene, until it is determined that the user has moved from the second position to the third different position.

21. The method as claimed in claim 12 where the second different position comprises at least one of a zoom via the first position or a move action relative to the first position.

22. The method as claimed in claim 12 further comprising:
determining a plurality of sets of audio elements within the audio scene, wherein the plurality of sets of audio elements have an associated location within the audio scene;
calculating a distance between an obtained location associated with the user and respective other locations of the respective sets of audio elements; and
selecting at least one of the audio element( from the plurality of sets of audio elements based on the distance between the obtained location associated with the user and the other location of the respective at least one audio elements.

23. The method as claimed in claim 12 where the audio scene comprises at least one of:
a six degree of freedom (6DOF) audio scene, or
audio waveforms as audio elements and metadata comprising position information.

24. A non-transitory computer readable medium comprising program instructions that, when executed with an apparatus, cause the apparatus to perform the method as claimed in claim 12.

25. An apparatus comprising:
at least one processor; and
at least one memory storing instructions that, when executed with the at least one processor, cause the apparatus to perform:
determining occurrence of a change in a user position from a first position to a different second position; and
based upon the determining of the occurrence of the change in the user position, switch rendering of a spatial audio signal between:
a first rendering comprising use of a subset of audio elements of an audio scene, where the subset comprises one or more of the audio elements of the audio scene which is less than all of the audio elements of the audio scene, and
a second rendering comprising use of the subset of audio elements and at least one auxiliary audio element.

26. The apparatus as claimed in claim 25 where the determining of the occurrence of the change in the user position from the first position to the different second position comprises determining occurrence of a change in at least one of:
a user location in the audio scene, or
a user orientation in the audio scene.

27. A method comprising:
determining occurrence of a change in a user position from a first position to a different second position; and based upon the determining of the occurrence of the change in the user position, switch rendering of a spatial audio signal between:
- a first rendering comprising use of a subset of audio elements of an audio scene, where the subset comprises one or more of the audio elements of the audio scene which is less than all of the audio elements of the audio scene, and
- a second rendering comprising use of the subset of audio elements and at least one auxiliary audio element.

28. A non-transitory computer readable medium comprising program instructions that, when executed with an apparatus, cause the apparatus to perform the method as claimed in claim 27.

29. An apparatus comprising:
at least one processor; and
at least one memory storing instructions that, when executed with the at least one processor, cause the apparatus to perform:
- using a subset of audio elements of an audio scene to render a first spatial audio signal, where the subset comprises one or more audio elements of the audio scene and is less than all of the audio elements of the audio scene; and
- based upon a determination that the user has performed a zoom or a move action relative to the audio scene using the subset of audio elements and at least one auxiliary audio element to render a different second spatial audio signal, where the audio scene comprises at least one of:
- a six degree of freedom (6DOF) audio scene, or
- audio waveforms as audio elements and metadata comprising position information.

* * * * *